UNITED STATES PATENT OFFICE.

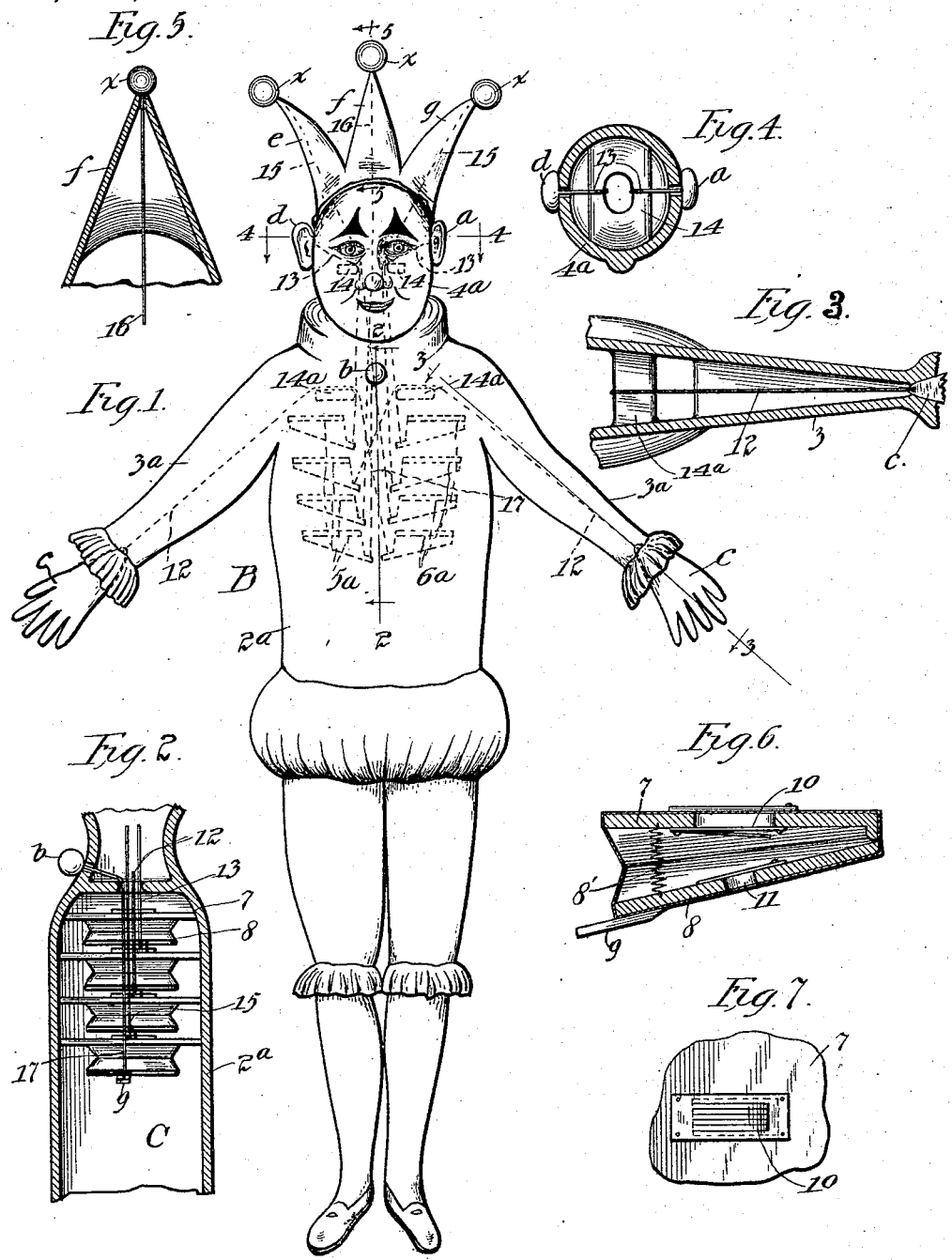

SAMUEL SIEGEL, OF CHICAGO, ILLINOIS, ASSIGNOR TO ANNA SIEGEL, OF CHICAGO, ILLINOIS.

MUSICAL TOY.

1,185,253.  Specification of Letters Patent.  Patented May 30, 1916.

Application filed March 11, 1915. Serial No. 13,723.

*To all whom it may concern:*

Be it known that I, SAMUEL SIEGEL, a citizen of the United States, residing at Chicago, in the county of Cook and State of Illinois, have invented new and useful Improvements in Musical Toys, of which the following is a full, clear, and exact description.

My invention relates to improvements in toys, and more particularly to children's toys of an amusing, instructive and educational nature.

The trend of education in teaching children is developing modern methods by which the child is first attracted and amused and then interested in simple things and acts, that it can see, hear and perform. Unconsciously the embryonic mind concentrates its mental faculties upon the things and acts, its imagination is aroused, gradually the ear is educated, the hand is trained, the eye coördinates with the ear and hand, and the child thus soon acquires ability to understand and comprehend.

The object of my invention is to teach the simple notes of music by acquainting and familiarizing the child with such sounds through the aid of a toy or other object, which, by the performance of a simple function, such, for instance, as the moving of a part or parts of the toy, will produce the common notes of a musical scale either in succession or in such manner as to bring forth a simple melody. This I accomplish by the means hereinafter fully described, and as particularly pointed out in the claims.

In the drawings: Figure 1 is a front elevation of my improved toy. Fig. 2 is a fragmentary vertical section through the torso of the toy on line 2—2, Fig. 1. Fig. 3 is an enlarged fragmentary section on line 3—3, Fig. 1, through one of the hollow arms of the toy. Fig. 4 is a horizontal section on line 4—4, Fig. 1, through the head of the toy. Fig. 5 is a vertical section through one of the broken away peaks of the cap. Fig. 6 is an enlarged longitudinal vertical section through one of the music producing bellows of said toy. Fig. 7 is a fragmentary view of one of the leaves of the bellows illustrating the reed attached thereto.

Referring to the drawings, B represents an animate object or toy which, preferably, as illustrated in Fig. 1, is a clown in a standing position with its arms held out from its body in an oblique position, and its hands $c$ open. The ears $d\ a$ of the clown stand out from its head, and upon the latter is placed a cap having three peaks, $e$, $f$ and $g$, each provided with a button or ball on its extremity.

The torso or body $2^a$ of my improved toy is made hollow, and the legs are suitably secured in proper position thereto. The upper part of the torso is provided with hollow arms $3^a$, $3^a$, and a hollow head $4^a$ extends upward therefrom midway between the arms. A scarf-pin $b$ is arranged upon the torso just below the head. The torso or body $2^a$, the arms $3^a$ and head $4^a$ together constitute the shell or casing of a main interior chamber C, and branches thereof, and within this chamber eight small bellows are placed that are arranged in two vertical tiers 5 and 6. The stationary leaf 7 of each bellows is uppermost, and is secured to the interior of the body $2^a$ in any suitable manner, preferably, by extending and securing its side edges thereto, as shown in Fig. 2, and the movable leaf 8 is hinged to the edge of the stationary leaf nearest the side of body $2^a$, and is provided at its edge nearest the center of the body with a longitudinally disposed finger 9 that projects a short distance beyond the same. The movable leaf is forced away from the stationary leaf by a coil expansion spring 8', which is placed between the two leaves near the inner ends thereof and normally maintains and automatically returns the bellows to a distended position. The bellows are each provided with a suitable reed 10, which are, preferably, located in the stationary leaf, 7, as shown in Fig. 7, and also with a valve controlled air-hole 11, which is, preferably, in the movable leaf 8. The musical tone of the reed of each bellows is different, and, preferably they are made so as to produce the musical notes of the common major scale, that is, $c$, $d$, $e$, $f$, $g$, $a$, $b$, $c$.

The hands $c$, $c$, at the end of the hollow arms $3^a$ are provided with wrists that fit into and close the open ends of said arms, and the inner extremities of these wrists are connected by cords 12 to fingers 9 of the movable leaves of certain bellows of each tier.

Cords 12 extend up through the interior of the hollow arms, over guide-bars 14ª connecting the front and back walls of the upper part of the chest of the torso, and from thence vertically downward through the interior of the torso to the respective bellows to which each is attached at its lower terminal. The hands $c$, $c$, are so mounted that they can be pulled out from the ends of the arms a slight distance, and when the right hand is pulled it produces the musical note known as low $c$, and when the left hand is pulled it produces the musical note high $c$.

Ears $a$ and $d$ are fitted over openings in the sides of the head of the toy figure and are connected by cords 13, 13, to finger 9 of certain other bellows of each tier 5ª and 6ª, said cords extending horizontally inward from their connection to the ears to and through a medial opening in a horizontal bar 14 arranged in the interior of the hollow head, as shown in Fig. 4, and from thence they extend vertically down through the hollow body to their points of attachment to the fingers of the bellows to which they are respectively attached. The ears are so arranged and connected, as hereinbefore described, that when the right ear is pulled the musical note $d$ is produced by the bellows to which it is connected, and when the left ear is pulled the musical note "$a$" is produced.

The ends of each peak $e$, $f$ and $g$ terminate in buttons or balls $x$, which are separate from the peaks and can be pulled or moved a slight distance out from the same. The buttons or balls of the side peaks $e$ and $g$ are connected by cords 15 to the fingers of certain other bellows of each tier and the button of the central peak $f$ is similarly connected by a cord 16 to one of the other bellows of said tiers. Cords 15 and 16 extend downward through the hollow peaks, thence through suitable openings in the head, and then almost straight down to the respective bellows to which they are connected, and when the button on the right hand peak $e$ is pulled the musical note "$e$" is sounded and likewise when the button on the left hand peak $g$ is pulled the musical note "$g$" is sounded, and when the button on the center peak $f$ is pulled the note "$f$" is sounded. The scarf-pin $b$ is placed over the aperture in the hollow body or torso which is located slightly below its juncture with the hollow neck and a cord 17 extends from said scarf-pin through said aperture and to the remaining bellows, and when said scarf-pin is pulled it produces the musical note "$b$".

Through this arrangement, a child may, by pulling successively upon the right hand, the right ear, the button on the right peak, the button on the central peak, the button on the left peak, the left ear, the scarf-pin, and the left hand sound the common musical scale, $c$, $d$, $e$, $f$, $g$, $a$, $b$ and $c$, or by manipulation of the various connected parts a simple melody can be produced.

My improved toy may be used in connection with my improved musical chart, shown and described in my companion application.

What I claim as new is:

1. A toy comprising a miniature representation of a conventional human figure having a hollow body, parts movably connected to and distributed upon different points of said body, and a plurality of separate sound producing devices arranged within said hollow body, and each independently connected to one of the movable parts.

2. A toy comprising a miniature representation of a conventional human figure having a hollow body, parts movably connected to and distributed upon different points of said body, and a plurality of separate sound producing devices arranged within said hollow body, and each independently connected to one of the movable parts; each sound producing device being adapted to produce a different sound.

3. A toy comprising a miniature representation of a conventional human figure having a hollow body, parts movably connected to and distributed upon different points of said body, and a plurality of separate sound producing devices arranged within said hollow body, and cords independently connecting each sound producing device to one of the movable parts.

4. A toy comprising a miniature representation of a conventional human figure having a hollow body, parts movably connected to and distributed upon different points of said body, a plurality of separate sound producing devices arranged within said hollow body, and means independently connecting each sound producing device to one of the movable parts.

5. A toy comprising a miniature representation of a conventional human figure having a torso provided with legs, arms and head, said torso, arms and head being hollow and forming a main interior chamber and branches thereof, movable parts suitably connected to the figure, a series of musical bellows arranged within the main interior chamber of the torso, and interiorly disposed cords connecting the movable parts to the musical bellows.

6. A toy comprising a minature representation of a conventional animate figure having a body provided with legs, arms and head, said body, arms and head being hollow and forming a main interior chamber and branches thereof, movable parts suitably connected to the exterior of the figure, a series of musical bellows arranged in tiers within the hollow interior chamber of said body and equal in number to the movable parts, and cords extending through the branches and connecting the movable parts to the musical bellows.

7. A toy comprising a miniature representation of a conventional figure having a body provided with legs, arms and head, a peaked cap on said head; said figure being hollow, a series of musical bellows arranged in said hollow body, movable parts suitably attached to said figure, and cords connecting said movable parts to the bellows.

8. A toy comprising a miniature representation of a conventional figure having a body provided with legs, arms and head, a peaked cap on said head, said figure being hollow, a series of musical bellows arranged in said hollow torso, movable parts suitably attached to said figure including hands, ears, buttons on the peaked cap, and a scarf-pin, said parts being equal in number to the bellows, and a like number of cords each of which separately connects one of said movable parts with one of the bellows.

9. A toy comprising a miniature representation of a conventional clown figure having a torso provided with legs, arms and head, a peaked cap on said head, the torso, arms, head and peaks of said cap being hollow, movable hands attached to the arms, movable ears connected to the head, movable buttons mounted on the peaks, a series of music producing devices arranged within the torso, and cords separately connecting said devices with the movable hands, ears and buttons.

10. A toy comprising a miniature representation of a conventional clown figure having a torso provided with legs, arms and head, a peaked cap on said head, the torso, arms, head and peaks of said cap being hollow, movable hands attached to the arms, movable ears connected to the head, a movable scarf-pin located on the front of the torso, music producing devices arranged within the torso, and cords separately connecting said devices with the movable hands, ears, scarf-pin and buttons.

11. A toy comprising a figure of hollow construction, a plurality of movable parts suitably attached to different portions of and forming a part of said figure, a plurality of musical bellows within said figure; said bellows being equal in number to the movable parts and each having a stationary leaf and a movable leaf, a projecting finger on the movable leaf, and a like plurality of cords each attached at its respective ends to one of the fingers and one of said movable parts.

12. A toy comprising a figure of hollow construction, a plurality of movable parts suitably attached to different portions of and forming a part of said figure, a plurality of musical bellows within said figure each having a stationary leaf and a movable leaf, a reed located in one of said leaves, one of said leaves also having an air-hole formed therein, a projecting finger on the movable leaf, and a cord attached at its respective ends to said finger and to one of said movable parts.

13. A toy comprising a figure of hollow construction, a plurality of movable parts suitably attached to different portions of and forming a part of said figure, a plurality of musical bellows within said figure each having a stationary leaf and a movable leaf, a spring mounted between said leaves and adapted to normally maintain the bellows in and automatically return said bellows to a distended condition, a projecting finger on the movable leaf, and a cord attached to its respective ends to said figure and said movable part.

14. A toy comprising a hollow figure, a plurality of separate movable parts suitably attached to and distributed at different points upon said figure, and a plurality of music producing bellows arranged in the interior of the hollow figure, and each individually and separably connected to one of said movable parts.

In witness whereof, I have hereunto set by hand this 3d day of March, 1915.
SAMUEL SIEGEL.

Witnesses:
FRANK D. THOMASON,
FLORENCE MITCHELL.

Copies of this patent may be obtained for five cents each, by addressing the "Commissioner of Patents, Washington, D. C."